(No Model.) 3 Sheets—Sheet 1.
B. MASON.
HAY RAKE AND STACKER.
No. 366,016. Patented July 5, 1887.
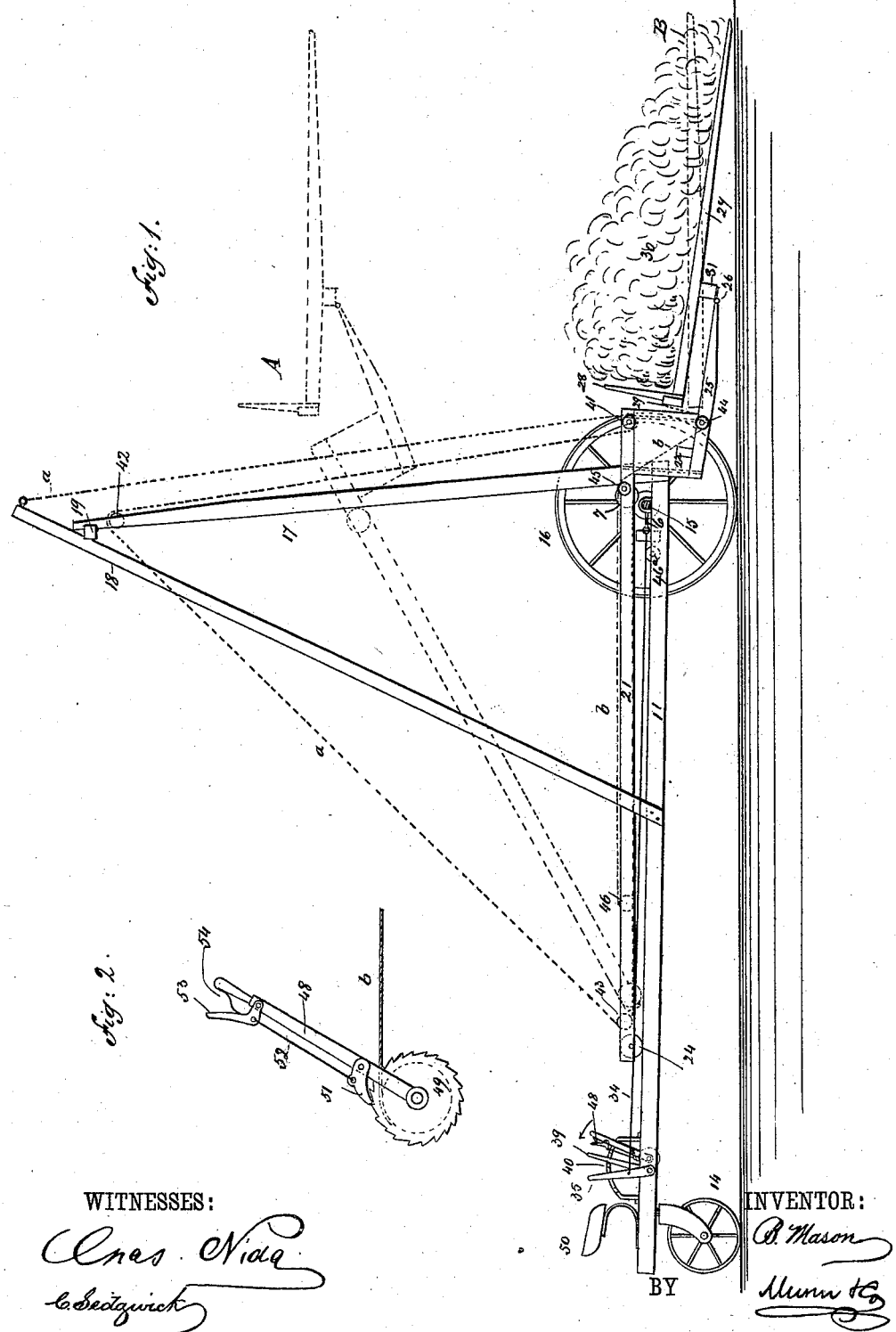

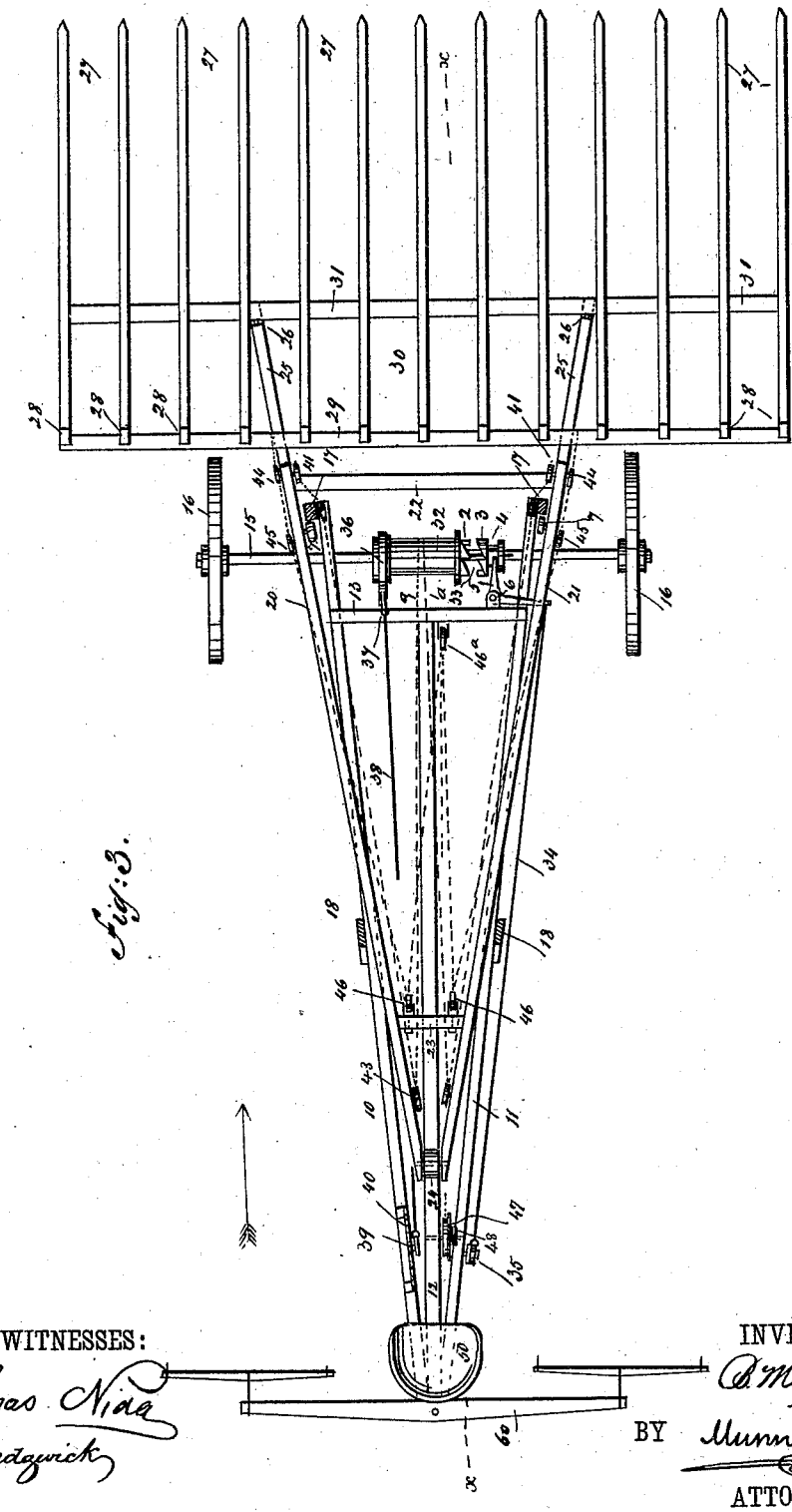

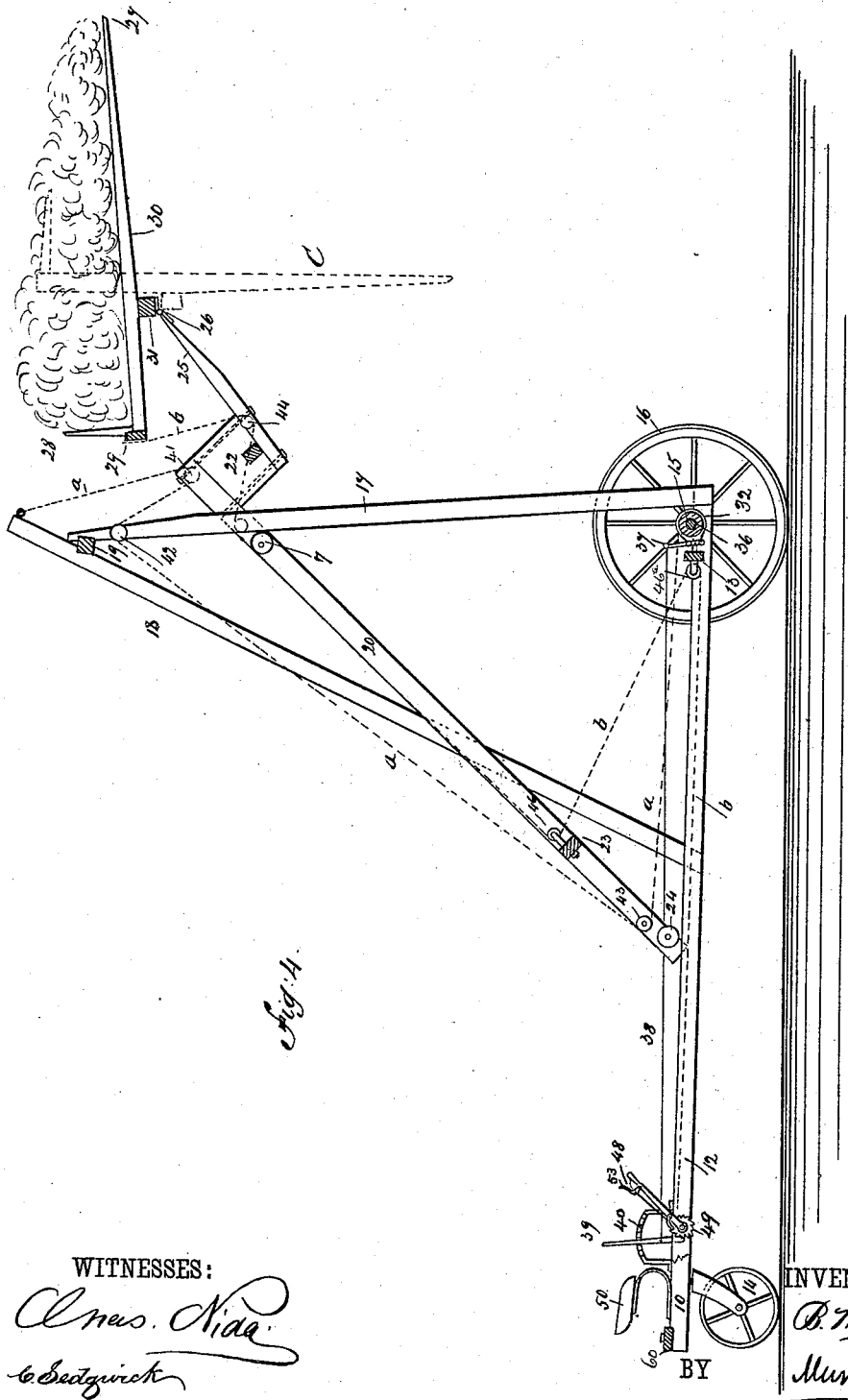

UNITED STATES PATENT OFFICE.

BUCK MASON, OF TRENTON, MISSOURI.

HAY RAKE AND STACKER.

SPECIFICATION forming part of Letters Patent No. 366,016, dated July 5, 1887.

Application filed December 27, 1886. Serial No. 222,692. (No model.)

*To all whom it may concern:*

Be it known that I, BUCK MASON, of Trenton, in the county of Grundy and State of Missouri, have invented a new and Improved Hay Rake and Stacker, of which the following is a full, clear, and exact description.

My invention relates to the construction of a combined hay rake and stacker, the object of the invention being to provide a machine whereby the hay may be gathered in the field and transported to the wagon or stack, there to be elevated and deposited upon said wagon or stack; and the invention consists of the novel constructions illustrated in the drawings, and specifically pointed out in the claims.

Reference is to be had to the accompanying drawings, forming a part of this specification, in which similar figures and letters of reference indicate corresponding parts in all the views.

Figure 1 is a side view of my improved rake and stacker, the parts being represented in full lines in the position to which they are adjusted for raking and in dotted lines in the position to which they are moved when the load is to be transported or moved from place to place. Fig. 2 is a detail view illustrating the construction and arrangement of the operating mechanism that is employed in connection with the hay-rake. Fig. 3 is a sectional plan view of the combined rake and stacker, the view being taken upon a line slightly above the main frame of the machine; and Fig. 4 is a longitudinal sectional view taken on line $x\, x$ of Fig. 3.

In constructing such a machine as the one illustrated in the drawings above referred to, I provide a frame which consists of two main longitudinal timbers, 10 and 11, and a central timber, 12, these timbers being united at their forward ends by a cross-bar, 13, while at the rear of the machine the timbers 10 and 11 are brought to bear closely against the sides of the timber 12, and the parts are thus united, the rear of the frame being supported by a caster-wheel, 14, while the forward portion of the frame is supported by the axle 15, to which the wheels 16 are rigidly connected. To the forward ends of the timbers 10 and 11, I secure substantially-vertical posts or standards 17, said posts or standards being braced and supported by forwardly-inclined braces 18, that are secured to the timbers 10 and 11, these braces being arranged to extend upward be-
yond the upper ends of the standards 17, a cross bar, 19, being arranged as best shown in Figs. 1 and 4.

Above the main frame of the machine I arrange a frame consisting of side strips, 20 and 21, the rear ends of which are connected by a short cross-bar, 23, that is arranged to extend over the central timber, 12. Between the extreme ends of the strips 20 and 21, I mount a wheel or roller, 24, which rests upon the central strip or timber, 12, and to the forward inner faces of the said strips 20 and 21, I connect wheels or rollers 7, that are arranged to bear against the rear faces of the posts or standards 17. Beneath the forward ends of each of the strips 20 and 21, I secure forwardly-extending arms 25, which are connected together by a cross-bar, 22, to which the rake 30 is hinged by hinges 26. This rake 30 consists, essentially, of a series of rake teeth, 27, and a series of back teeth, 28, which extend at right angles from the rear ends of the teeth 27, a connecting-strip, 29, being arranged as indicated, while the teeth 27 are united to and supported by a strip, 31, to which the hinges 26 are secured. It will be noticed that the strip 31 is placed to the rear of the center of the teeth, 27, so that when the rake is loaded the preponderance of weight will be out beyond said strip.

In order that the machine described may be properly operated, I provide such a mechanism as will now be specifically described. Upon the axle 15 there is loosely mounted a drum, 32, formed with one section, 2, of a clutch, 33, the other section, 3, of the clutch being mounted on a feather that is formed on the axle 15; or the axle might be squared or irregularly formed to receive the section 3. The section 3 of the clutch 33 is formed with an annular groove, 4, in which there rides the arm 5 of a bell-crank lever, 6, said lever being connected by means of a rope or wire, 34, with a lever, 35, that is pivotally connected to the timber 11 just in advance of the seat 50, the lever 6 itself being pivotally connected to the cross-timber 13. Upon one side of the drum 32 there is arranged a brake-strap, 36, that is connected to a lever, 37, which lever is pivotally connected to the cross-bar 13, and the lever 37 is in turn connected to a lever, 39, by a rope, 38, this lever 39 being mounted at the rear of the machine and arranged in connection with a rack, 40. Ropes $a$ are secured to the upper ends of the bracing-strips 18, and these ropes pass downward and about sheaves 41, that are carried by the strips 20 and 21, thence upward and over sheaves 42, that are fixed near the upper ends of the posts or standards 17, thence downward and about sheaves 43, that are carried at or near the lower ends of the strips 20 and 21, and thence forward to the drum 32, the arrangement being such that when the ropes $a$ are wound upon the drum the frame carrying the rake will be moved to the position indicated by dotted lines at A in Fig. 1, and finally to the position in which the parts are shown in Fig. 4.

As before stated, when the rake is loaded the preponderance of the weight of the load will be outward beyond the hinged connection of the rake with the arms 25, and consequently it is necessary to provide a means by which the rake may be held in such position as may be required, and to this end I connect cords $b$ to the connecting-strip 29, which cords pass downward from said connecting-strip to sheaves 44, that are carried by the arms 25, thence about sheaves 45, that are carried by the strips 20 and 21, then to sheaves 46, that are secured to the rear or lower ends of the strips 20 and 21, or to the short cross-strip 23, thence forward and about a sheave, 46ª, and backward to a drum, 47, said drum 47 being mounted between the timbers 11 and 12, and provided with a lever, 48, that is loosely mounted upon the shaft of the drum, which drum is provided with a ratchet-wheel, 49. The lever 48 carries a pawl, 51, that is connected by means of a rod, 52, with a hand-piece, 53, said hand-piece being normally held in the position in which it is shown in Fig. 2 by the action of a spring, 54.

In operation the rake is lowered to the position in which it is shown in full lines in Fig. 1, and the team, which is attached to a double-tree, 60, that is secured to the rear end of the machine, is started forward in the direction of the arrow shown in Fig. 1. When after a sufficient quantity of hay has been gathered by the rake, the lever 48 is thrown backward in the direction of the arrow shown in connection therewith in Fig. 1, which movement will wind the ropes $b$ upon the drum 47 and raise the forward ends of the rake-teeth to the position shown at B in dotted lines in Fig. 1. The machine is then driven to within a short distance of the stack or wagon upon which the load is to be dumped, this distance depending upon the height to which the load carried by the rake is to be raised. When this required distance is reached, the lever 35 is thrown in a direction so that the two sections of the clutch 33 will be brought into engagement, thus causing the drum 32 to revolve with the axle. As the drum revolves, the ropes $a$ will be wound thereon, and in winding upon the drum will draw the forward end of the frame, carrying the rake upward, the rollers 7 at this time bearing against the rear faces of the posts or standards 17, while the rear end of the rake-carrying frame is drawn forward. After the load has been raised to the required height, the hand-piece 53 of the lever 48 will be drawn inward, to release the pawl 51 from engagement with the ratchet-wheel 59, thus leaving the rake free to drop to the position in which it is shown in dotted lines at C in Fig. 4. When it is desired to hold the load in an elevated position—such, for instance, as that in which the parts are shown in full lines in Fig. 4—the lever 35 is thrown to disengage the clutch-section, and the lever 39 is moved to a position so as to bring the brake-strap 36 into close contact with the braking-surface of the drum 32, thus preventing any movement of the drum.

Having thus fully described my invention, I claim as new and desire to secure by Letters Patent—

1. In a horse hay-rake, the combination, with the main frame of the machine and its vertical standards, of a rake-carrying frame provided with forwardly-extending arms 25, a rake hinged to said arms, a rope connected to the rake and to a drum carried by the main frame of the machine, and guiding-sheaves over which the rope is arranged to pass, substantially as described.

2. In a horse hay-rake, the combination, with the main frame provided with vertical standards 17, of a rake-carrying frame provided with forwardly-extending arms 25, a rake hinged to said arms, a drum, 47, ropes $b$, connected to the drum and to the rake, sheaves 44, 45, 46, and 46ª, and a drum-operating mechanism, substantially as described.

3. In a horse hay-rake, the combination, with the main frame provided with the horizontal central timber or track and vertical standards, of the frame having its one end provided with a roller or wheel and its opposite end provided with rollers or wheels, and with forwardly-projecting arms, a rake hinged to said arms, a rope connected to the rake and to a drum carried by the main frame of the machine, and guiding-sheaves over which the cord passes, substantially as and for the purpose set forth.

4. In a horse hay-rake, the combination, with the main frame provided with the horizontal central timber or track and vertical standards, of the frame having its one end provided with a roller or wheel and its opposite end provided with rollers or wheels, and with forwardly-extending arms, a rake hinged to said arms, a rope connected to the rake and to a drum carried by the main frame of the machine, and the manipulating-lever applied to the shaft of said drum and carrying a propelling-pawl engaging ratchet-teeth on said drum, substantially as and for the purpose set forth.

BUCK MASON.

Witnesses:
J. M. WANNAMAKER,
E. B. COOPER.